Oct. 20, 1925.

R. B. BOSTWICK

VEHICLE TIRE

Filed Aug. 13, 1923

1,557,972

INVENTOR
Rolla B. Bostwick
By Kay Totten & Brown,
Attorneys

Patented Oct. 20, 1925.

1,557,972

UNITED STATES PATENT OFFICE.

ROLLA B. BOSTWICK, OF DUQUESNE, PENNSYLVANIA.

VEHICLE TIRE.

Application filed August 13, 1923. Serial No. 657,224.

*To all whom it may concern:*

Be it known that I, ROLLA B. BOSTWICK, a citizen of the United States, and resident of Duquesne, in the county of Allegheny and State of Pennsylvania, have invented a new and useful Improvement in Vehicle Tires; and I do hereby declare the following to be a full, clear, and exact description thereof.

My invention relates to non-pneumatic tires for automobiles and other vehicles, and its object is to provide a non-pneumatic tire which may be employed with an ordinary shoe or casing of the kind used in pneumatic tires, and which shall be so constructed as to have great resiliency, thereby producing the easy-riding effects of a pneumatic tire without the inconveniences due to punctures and blow-outs.

In Letters Patent No. 1,367,011 granted to me February 1, 1921, and No. 1,367,856 granted to me February 28, 1921, I have shown non-pneumatic vehicle tires in which the core of the tire is composed of an outer member of rubber arranged adjacent to the tread of the casing, and supported by a hollow metal member which is made wedge-shaped in cross section and is provided with a rounded inner nose portion which bears against the free edges of the casing and tends to force the beads of the casing against the flanges of the rim.

The tires constructed with the hollow metal core supports which are shown in the prior patents mentioned are entirely satisfactory for many purposes, but I have discovered that greater resiliency is obtained by employing, instead of a metal core support, a rubber member of somewhat similar shape, the rubber composing the inner or supporting part of the core being softer than the outer portion which is adjacent to the tread of the casing. I have also found that this construction, wherein the inner part of the core is softer than the outer part, affords greater resiliency than is obtained by a core having a soft rubber tread portion supported by a harder rubber inner portion.

Figure 1:
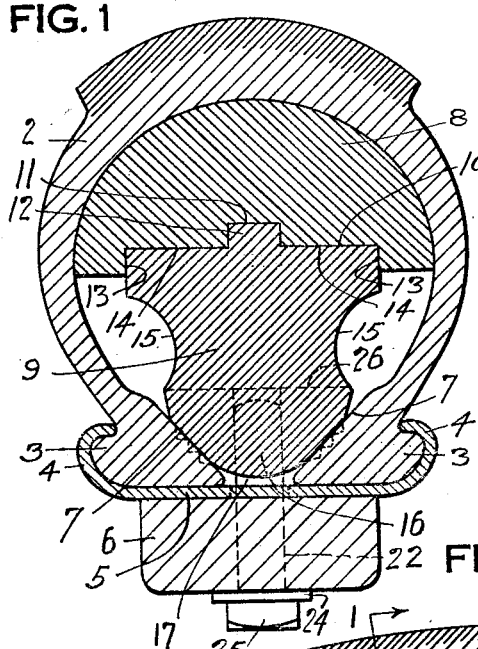
Figure 2:
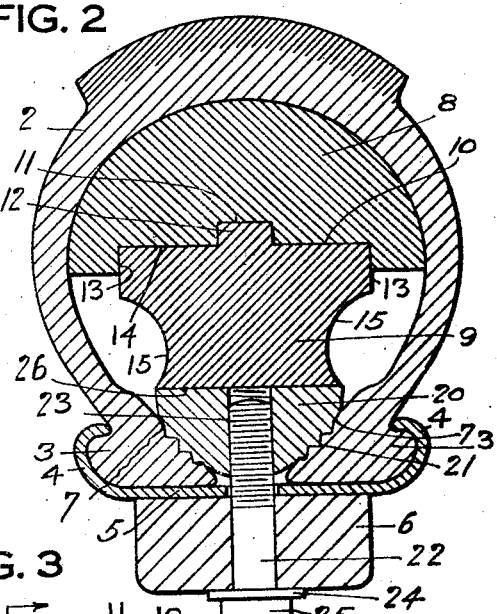
Figure 3:
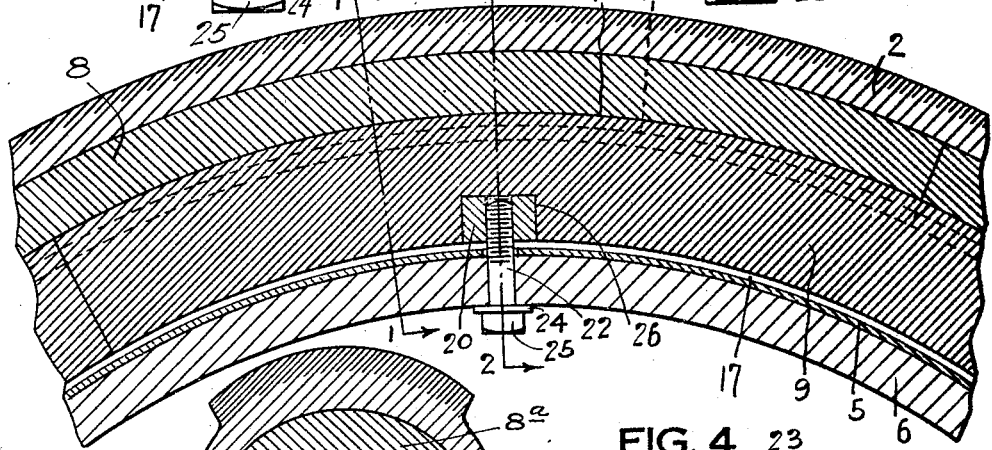
Figure 5:
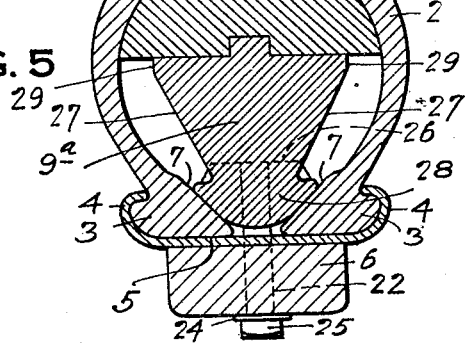
Figure 4:
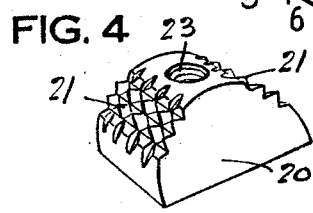

In the accompanying drawing, Fig. 1 is a transverse sectional view taken through a tire constructed in accordance with my invention, the section being taken substantially on the line 1—1, Fig. 3; Fig. 2 is another sectional view, similar to Fig. 1, showing the position of the anchoring wedge, the section being taken substantially on the line 2—2, Fig. 3; Fig. 3 is a longitudinal radial section through a portion of the tire shown in Figs. 1 and 2; Fig. 4 is a perspective view of the anchoring member, and Fig. 5 is a transverse sectional view showing a core of modified construction.

In the drawing the numeral 2 indicates a casing or shoe which may be of any desired type such as is used in pneumatic tires for automobiles. A clincher tire is shown herein, but the tire may equally well be of the straight-side type. The casing 2 has beads 3 which, when the tire is in use, are received within the flange portion 4 of a rim 5 which is carried by the usual felly 6. Adjacent to the beads 3 the casing has flat tapering inner surfaces 7.

Within the casing 2, but formed separate therefrom, is a core consisting of an outer or tread section 8, and an inner or supporting section 9. Both of the members 8 and 9 are made of rubber, rubber substitute, or other resilient and elastic material. The member 9 is preferably made of softer material than the member 8, and this is best done by making the members 8 and 9 separately and fitting them together in the manner shown in the drawing. However, it is within the scope of my invention to make the members 8 and 9 integral with each other, if desired.

The members 8 and 9 are so interfitted as to prevent these parts from being separated by twisting or bending movements. To this end, the member 8 is provided with a longitudinal recess 10 in the center of which is formed a smaller recess 11. The outer portion of the supporting member 9 fits within the large recess 10 and is provided with a projecting central rib 12 that is received in the recess 11 of the outer member 8. As shown in Figs. 1 and 2 of the drawing, the upper side edges 13 of the inner member 9 form right angles with the outer surface 14 of this member, and the large recess 10 in the outer member 8 is correspondingly formed with right-angled corners. There may be, however, some variation from this precise construction, provided that the members 8 and 9 are made to interfit with each other so as to resist separation by twisting and bending movements.

The sides of the member 9 may be lightened by forming grooves in them as shown at 15. The inner or nose portion 16 of the member 9 is rounded to engage the tapering surface 7 of the casing with a wedging action which tends to force the beads of the casing into the flanged recesses of the rim. The parts are preferably so shaped that a space 17 exists between the rounded nose portion 16 of the member 9 and the surface of the rim 5 so that the member 9 may have a certain amount of radial play and may thereafter exert its wedging action upon the beads of the casing.

In order to secure the assembled tire upon the rim 5, and also to insure that none of the parts will creep upon the rim or with relation to each other, I employ a wedge-shaped anchoring member 20 which, as best shown in Fig. 4, is provided on its sides with teeth 21, or other projections, which bite into the tapered inner walls 7 of the casing and tend to clamp the beads of the casing downwardly and outwardly against the rim. This clamping action is produced by means of a bolt 22 which is screwed into a central threaded opening 23 in the member 20 and which may extend through a washer 24 and through the valve-stem hole which is ordinarily provided in the felly 6. By turning the head 25 of the bolt 22, the member 20 may be forced to compress the adjacent portions of the casing tightly upon the rim.

The anchoring member 20 is received in a recess 26 which is formed in the inner core member 9 and thus resists lengthwise creeping movement of the core with respect to the casing. It will be observed that the sides of the anchoring member 20 are of substantially the same rounded shape as the inner portions of core member 9 so that the member 20 may be assembled with the core and placed upon the rim without difficulty.

The core members 8 and 9 may each be made in one or more sections. For convenience, I prefer to make each of these members with two or three sections, of proper length to fill the cavity of the casing 2 when the sections are assembled in the casing.

The construction shown in Fig. 5 differs from that of the preceding figures in that the inner or supporting part 9ª of the core is made with straight tapering sides 27 below which is an enlarged nose portion 28 which engages the inner surfaces 7 of the casing 2 with the same effect as the nose portion of the member 9 of Figs. 1 to 3. As shown, the outer or tread portion 8ª of the core in Fig. 5 is made straight but, if desired, the edges of the member 8ª may be brought down to enclose the upper surfaces 29 of the member 9ª as shown in Figs. 1 and 2.

It will be noted that the casing of the tire is not modified in any way, and also that the core construction is not made integral with the casing. Therefore, when a casing is worn through it is only necessary to remove the core members and place these members in a new casing, a single core structure being therefore suitable for use with many different casings.

Tires constructed in the manner described herein have been found by actual test to have superior resiliency as compared with tires of the constructions shown in the patents mentioned above, and have been found to compare favorably with pneumatic tires as to their resiliency and easy-riding qualities.

I have shown and described the manner in which I prefer to construct my improved tires, but it will be understood that various changes may be made within the scope of my invention as set forth in the appended claims.

I claim as my invention:

1. In a vehicle tire, the combination of a casing adapted to seat upon a wheel rim and a resilient core contained within said casing, said core comprising an outer portion of substantially semi-circular cross section and composed of rubber or an equivalent elastic material, and an inner substantially annular portion of softer rubber normally spaced from the wheel rim, said inner core portion having its inner surface rounded to form a wedging nose engaging said casing adjacent to the free edges thereof.

2. In a vehicle tire, the combination of a casing and a resilient core contained within said casing, said core having an outer or tread portion of substantially semicircular cross section and composed of an elastic material, said outer core member having a longitudinal recess and a narrower longitudinal recess within said first-named recess, and an inner core portion of softer rubber or equivalent elastic material than said outer core portion, said inner core portion being fitted within the recesses of said outer core portion and having its inner edge rounded to form a wedging nose engaging the inner walls of said casing adjacent to the free edges thereof.

In testimony whereof I, the said ROLLA B. BOSTWICK, have hereunto set my hand.

ROLLA B. BOSTWICK.